United States Patent
Thanayankizil et al.

(10) Patent No.: US 12,464,447 B2
(45) Date of Patent: Nov. 4, 2025

(54) SELECTION OF OFFLOAD-OPPORTUNITY WIRELESS NETWORKS THAT RESPECT PERSONAL DATA

(71) Applicant: GM GLOBAL TECHNOLOGY OPERATIONS LLC, Detroit, MI (US)

(72) Inventors: Lakshmi V. Thanayankizil, Rochester Hills, MI (US); James J. Kelly, III, Detroit, MI (US); Christopher J. Wieland, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 18/357,760

(22) Filed: Jul. 24, 2023

(65) Prior Publication Data

US 2025/0039778 A1   Jan. 30, 2025

(51) Int. Cl.
*H04W 48/18* (2009.01)
*H04B 17/318* (2015.01)
*H04W 48/16* (2009.01)
*H04W 84/12* (2009.01)

(52) U.S. Cl.
CPC .......... *H04W 48/18* (2013.01); *H04B 17/318* (2015.01); *H04W 48/16* (2013.01); *H04W 84/12* (2013.01)

(58) Field of Classification Search
CPC ..... H04W 48/18; H04W 48/16; H04W 84/12; H04W 4/44; H04W 4/40; H04W 8/18; H04B 17/318
See application file for complete search history.

(56) References Cited

U.S. PATENT DOCUMENTS

2015/0154669 A1* 6/2015 Wu ................... G06Q 30/0284
  705/13
2018/0027504 A1  1/2018 Matsushita

FOREIGN PATENT DOCUMENTS

CN   111867052 A    10/2020
DE   102016115967   3/2017

OTHER PUBLICATIONS

German Office Action dated Jun. 6, 2024.

* cited by examiner

*Primary Examiner* — Diane D Mizrahi
(74) *Attorney, Agent, or Firm* — Quinn IP Law

(57) ABSTRACT

Herein, a technology that facilitates the selection of offload-opportunity wireless networks that respects personal data is discussed. The technology includes tracking a wireless network environment of a parked vehicle and selecting qualifying candidate wireless networks to be an offload-opportunity wireless network. The technology further includes joining the selected wireless network in response to a user's affirmative confirmation.

20 Claims, 3 Drawing Sheets

SELECTION OF OFFLOAD-OPPORTUNITY WIRELESS NETWORKS THAT RESPECT PERSONAL DATA

INTRODUCTION

Over-the-air (OTA) updates for vehicles allow manufacturers to wirelessly update the software and firmware of vehicles. This process eliminates the need for owners to visit a service center for software-related updates. OTA updates offer convenience, enable software enhancements and bug fixes, and improve cybersecurity. Not all vehicles support OTA updates, but many modern electric and some traditional vehicles are equipped with the necessary technology.

Many modern vehicles can wirelessly connect via cellular or mobile networks, satellite communications, and/or wireless local area networks (WLAN). Vehicles transfer data using at least one of these wireless connections.

SUMMARY

According to one embodiment, a method that includes: detecting that a vehicle is parked; in response to the detection that the vehicle is parked, initiating a parking session of the vehicle, wherein the parking-session initiation includes: scanning for, identifying, and tracking one or more wireless local area networks (WLANs) within range of the vehicle; detecting that the vehicle is activated; in response to the detection of the activation of the vehicle, terminating the parking session of the vehicle, wherein the parking-session termination includes: calculating a duration of the parking session; scanning for and identifying one or more WLANs within range of the vehicle; selecting one or more of the WLANs that were identified during both the parking-session initiation and the parking-session termination; and determining that one or more of the selected WLANs meet one or more qualifying criteria; in response to the duration of the parking session exceeding the parking-session threshold, scoring one or more of the determined WLANs; based on the scoring, designating a WLAN of one or more scored WLANs as an offload-opportunity network to join; prompting a user of the vehicle to authorize the vehicle to join the opportunity network; and in response to the prompting, joining the opportunity network to communicate therethrough.

In this embodiment of the method, wherein one or more qualifying criteria of the selected WLANs include having a signal strength exceeding a signal-strength threshold and having a secure security status.

With this embodiment, the method further includes, in response to the duration of the parking session exceeding the parking-session threshold, updating a set of data fields in a scoring data structure, the set being associated with at least one of the determined WLAN.

In this embodiment of the method, wherein one of the data fields of the set includes an encounter count, the updating further includes incrementing value of the encounter count.

In this embodiment of the method, wherein the data fields of the set are selected from a group consisting of an encounter count, a signal measurement, a security status, a parking-session duration, a parked time-of-day (e.g., morning, afternoon, evening, overnight, early morning), a date of last encounter (e.g., last seen), and a channel of operation.

In this embodiment of the method, wherein the scoring includes calculating a score based on the set associated with at least one of the determined WLAN and storing the calculated score in the scoring data structure in association therewith.

In this embodiment of the method, wherein the scoring includes calculating a score associated with at least one of the scored WLAN and storing the calculated score in a scoring data structure in association therewith.

In this embodiment of the method, wherein the designating includes: accessing a scoring data structure containing sets of data fields, each set being associated with one WLAN of a collection of WLANs and each set having a score data field, and updating the score data field of a set associated with a WLAN that matches one of the determined WLANs.

In this embodiment of the method, wherein the designating further includes: comparing values of the score data fields of the sets of the scoring data structure; based on the comparing, determining that a particular WLAN has a greatest score associated therewith; and nominating the particular WLAN as the offload-opportunity network to join.

According to yet another embodiment, a non-transitory machine-readable storage medium encoded with instructions executable by one or more processors that, when executed, direct one or more processors to perform operations that include detecting that a vehicle is parked; in response to the detection that the vehicle is parked, initiating a parking session of the vehicle, wherein the parking-session initiation includes: scanning for, identifying, and tracking one or more wireless local area networks (WLANs) within range of the vehicle; detecting that the vehicle is activated; in response to the detection of the activation of the vehicle, terminating the parking session of the vehicle, wherein the parking-session termination includes: calculating a duration of the parking session; scanning for and identifying one or more WLANs within range of the vehicle; selecting one or more of the WLANs that were identified during both the parking-session initiation and the parking-session termination; and determining that one or more of the selected WLANs meet one or more qualifying criteria; in response to the duration of the parking session exceeding the parking-session threshold, scoring one or more of the determined WLANs; and based on the scoring, designating a WLAN of one or more scored WLANs as an offload-opportunity network to join.

Another non-transitory machine-readable storage medium embodiment in which the operations further comprise, in response to the duration of the parking session exceeding the parking-session threshold, updating a set of data fields in a scoring data structure, the set being associated with at least one of the determined WLAN.

Another non-transitory machine-readable storage medium embodiment in which one of the data fields of the set includes an encounter count, the updating further includes incrementing value of the encounter count.

Another non-transitory machine-readable storage medium embodiment in which the scoring operation includes calculating a score associated with at least one of the scored WLAN and storing the calculated score in a scoring data structure in association therewith.

Another non-transitory machine-readable storage medium embodiment, the operations further includes prompting a user of the vehicle to authorize the vehicle to join the opportunity network.

Another non-transitory machine-readable storage medium embodiment, the operations further includes, in response to the prompting, joining the opportunity network to communicate therethrough.

Another non-transitory machine-readable storage medium embodiment, the operations further includes: prompting a user of the vehicle to authorize the vehicle to join the opportunity network; and, in response to the prompting, resetting values in one or more of the data fields in the scoring data structure.

According to yet another embodiment, a method that facilitates a selection of an offload-opportunity wireless network that respects personal data of a user of a vehicle, the method comprising: detecting that a vehicle is parked; in response to the detection that the vehicle is parked, initiating a parking session of the vehicle, wherein the parking-session initiation includes: scanning for, identifying, and tracking one or more wireless local area networks (WLANs) within range of the vehicle; detecting that the vehicle is activated; in response to the detection of the activation of the vehicle, terminating the parking session of the vehicle, wherein the parking-session termination includes: calculating a duration of the parking session; scanning for and identifying one or more WLANs within range of the vehicle; selecting one or more of the WLANs that were identified during both the parking-session initiation and the parking-session termination; and determining that one or more of the selected WLANs meet one or more qualifying criteria; in response to the duration of the parking session exceeding the parking-session threshold, scoring one or more of the determined WLANs; based on the scoring, designating a WLAN of one or more scored WLANs as an offload-opportunity network to join; prompting a user of the vehicle to authorize the vehicle to join the opportunity network; and in response to the prompting, joining the opportunity network to communicate therethrough.

Another embodiment of the method, further includes: prompting a user of the vehicle to authorize the vehicle to join the opportunity network; in response to the prompting, joining the opportunity network to communicate therethrough.

Another embodiment of the method, further includes accessing a set of data fields in a scoring data structure, the set being associated with at least one of the determined WLAN, wherein the data fields of the set are selected from a group consisting of an encounter count, a signal measurement, a security status, a parked duration, a parked time-of-day, a date of last encounter, and a channel of operation.

Another embodiment of the method wherein the method is performed free of access to the personal data of the user of the vehicle.

DETAILED DESCRIPTION

Figure 1:
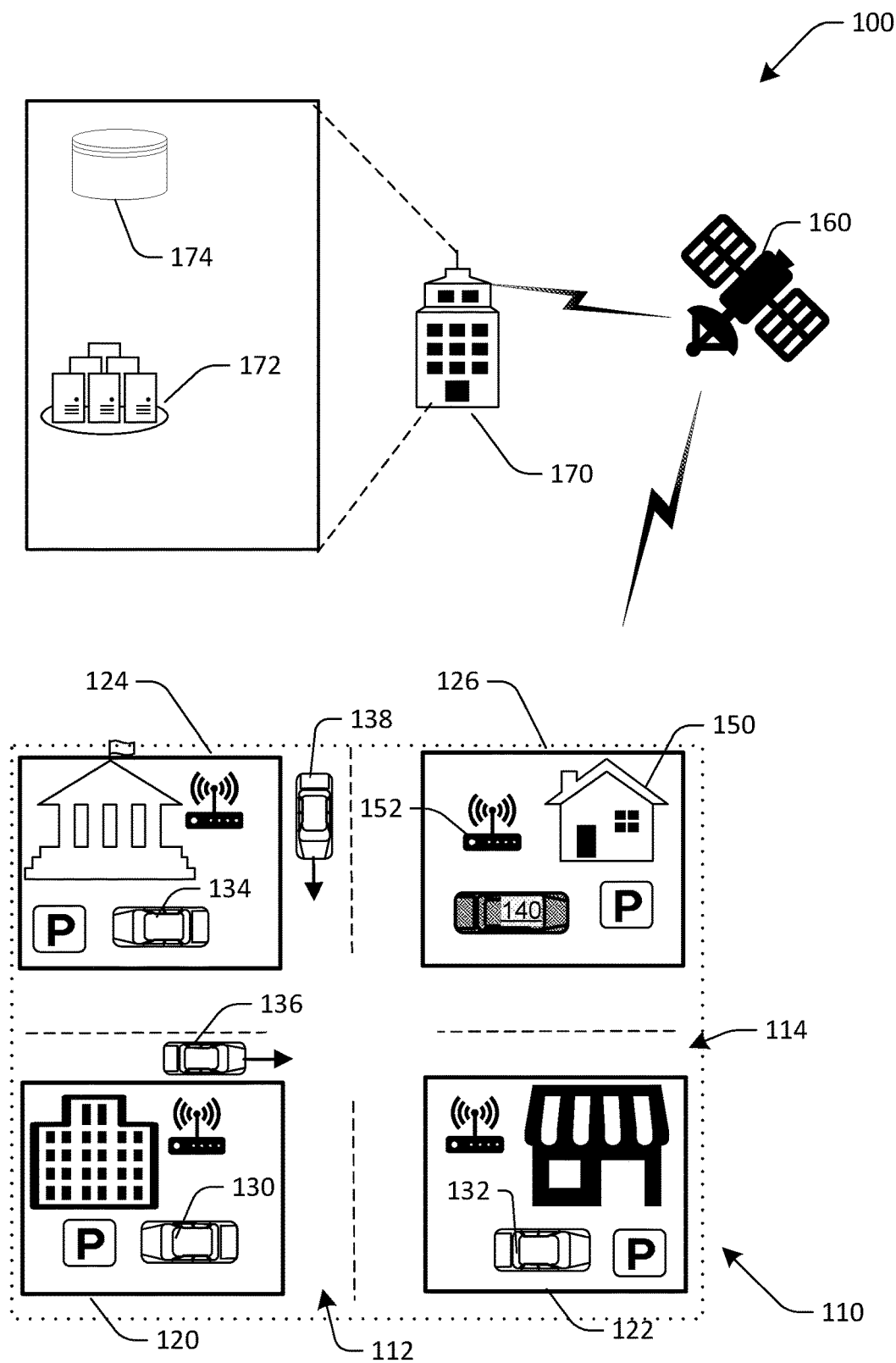
FIG. 1 illustrates an example scenario of a parked vehicle configured to facilitate the selection of offload-opportunity wireless networks that respect personal data, in accordance with one or more implementations described herein.

The technology described herein facilitates the selection of offload-opportunity wireless networks that respect personal data. The technology and techniques described herein identify an offload-opportunity wireless local area network (WLAN) and suggests that the user of the vehicle choose that WLAN for connection to a data network (e.g., the Internet). Hopefully, the user has authorized access to the identified offload-opportunity WLAN, such as a home-based or work-based WLAN. The technology described herein accomplishes this without determining location-related information based on person-specific information about the user. Thus, personal data is respected.

Referring now to the drawings, wherein like numerals indicate like parts in the several views of various systems and approaches are shown and described herein. Disclosed approaches may be suitable for use with automotive vehicles, which include manual, autonomous, and semi-autonomous driving.

FIG. 1 illustrates an example scenario 100 that includes a map 110, a satellite 160, and a remote communications ("comm") center 170, which are suitable for the implementation of the technology described herein. Map 110 depicts a geographic region with various parkable locations, such as 120, 122, 124, and 126. A parkable location is a place where a vehicle may be parked. In some instances, parkable locations may be mutually exclusive of each other. In other instances, the parkable locations may overlap.

As depicted in map 110, the locations are separated by intersecting roads 112 and 114. Sometimes, the roads may be part of their location or one or more locations. As shown by the forward arrow projecting from their front, automotive vehicles 136 and 138 are shown driving on roads 114 and 112, respectively. For the sake of simplicity in illustration, each parkable location is shown with a parking area labeled with a capital P in a rounded square.

A parkable location may have one or more wireless local area networks (WLANs) within range of a vehicle parked in a parking area of that location. WLANs offer convenience and mobility, allowing users to connect to the Internet or network resources without needing physical cables. They have become prevalent in homes, offices, cafes, airports, and other public places, providing wireless connectivity for various devices.

WLANs use radio waves to transmit and receive data, enabling devices like laptops, smartphones, tablets, and others to connect to the network. WLANs typically utilize the IEEE (Institute of Electrical and Electronics Engineers) 802.11 standards, commonly called the WI-FI™ standards. These standards define the specifications for wireless communication, including frequency bands, data transfer rates, and security protocols.

WLANs are set up using wireless access points (WAPs) or routers, which serve as the central hubs for wireless connections. The access points transmit and receive data between the wireless devices and the wired network infrastructure, such as the Internet or a local server. As used herein, a WLAN may also be called a "hotspot."

As depicted in FIG. 1, location 120 includes office buildings, one or more WLANs (as shown as a WAP with radio waves emitting from there), and an automotive vehicle 130 parked therein. Location 122 includes a shopping mall, one or more WLANs, and an automotive vehicle 132 parked therein. Location 124 includes governmental buildings, one or more WLANs, and an automotive vehicle 134 parked therein. Location 126 includes house 150, one or more WLANs 152, and a parked vehicle 140.

The vehicles (130, 132, 134, 136, 138, 140) may be configured to communicate with the comm center 170 wirelessly. This wireless communication may include, for example, one or more of the following: satellite communications (as depicted by satellite 160), WI-FI™, BLUETOOTH™, cellular communications, radio communications, and/or Internet communications.

The comm center 170 includes one or more computing systems 172 and one or more databases 174. While shown as one location in FIG. 1, the components and functionality of the comm center 170 may be distributed geographically and across multiple data centers. The "central" part of the name refers to the virtual appearance to the vehicles. Comm center 170 is remote or separate from the vehicles.

Once it stops, parked vehicle 140 detects that it is no longer in motion (i.e., stationary) and has been placed into a parking "gear." The vehicle may be placed into "park." This is done by selecting "Park" or "P" with the gear selections. In doing so, the automatic transmission disconnects the engine from the transmission and locks the transmission with a pawl so that the transmission cannot turn while still connected to the wheels. In some instances, a parking brake may be engaged once parked. The parking brake is connected to the brake disks or drums and restricts and/or prevents the wheels from turning when engaged. The parking brake is separate from the transmission. Herein, a defined parking gear includes one or more of the "Park" selections, the pawl lock of the transmission, or the parking brake.

Once parked, parked vehicle 140 starts (i.e., initiates) a parking session. Presumably, the driver of the vehicle exits. When doing so, parked vehicle 140 is typically deactivated. That is, parked vehicle 140 is "turned off." In some instances, this may be called "turning off" the vehicle's engine. Under normal operating conditions, a vehicle can be deactivated when parked. Thus, herein, a deactivated vehicle is parked.

Once in the parking session, vehicle 140 performs an initial inventory of the WLANs within the vehicle's range. As part of the initial inventory, vehicle 140 scans for, identifies, and tracks one or more in-range WLANs. The tracking includes creating an initial inventory list that documents each WLAN detected and its associated properties, such as its identifiers (e.g., service set identifier (SSID) and media access control (MAC) address), signal measurement, security status, current time and date, and channel of operation.

Once the driver returns to parked vehicle 140, the driver activates (e.g., "turns the ignition on"). Once parked vehicle 140 detects that activation, the parking session ends (i.e., terminates). Thus, in response to the detection of the activation of the vehicle, parked vehicle 140 terminates the parking session of the vehicle.

As part of the parking-session termination, parked vehicle 140 calculates the duration of the parking session. The parking-session duration is the difference between the time the parking session was initiated and the time it ended.

Parked vehicle 140 determines whether the parking-session duration exceeds a minimum parking time, such as four, five, or six hours. Since this technology is attempting to identify an offload-opportunity WLAN (such as a home-based or work-based WLAN) that the user is authorized to access, the minimum parking time is typically a time that represents the vehicle being parked for an extended time (such as at work or home), rather than a transitional time (such as shopping or visiting a friend).

If the parking-session duration exceeds the minimum parking time, then parked vehicle 140 inventories WLANs that are within range of the vehicle. Like it did with the initial inventory at the start of the parking session, parked vehicle 140 scans for, identifies, and tracks one or more in-range WLANs. This includes documenting each WLAN detected and its associated properties, such as its identifiers (e.g., service set identifier (SSID) and media access control (MAC) address), signal measurement, security status, current time and date, and channel of operation.

Furthermore, as part of the parking-session termination, parked vehicle 140 determines which of one or more of the WLANs were identified during both the parking-session initiation and the parking-session termination. These WLANs are selected as candidates to be an offload-opportunity WLAN that respects the personal data of a user (e.g., driver) of parked vehicle 140.

Further still, as part of the parking-session termination, parked vehicle 140 determines whether one or more of the candidate WLANs meet one or more qualifying criteria. Examples of qualifying criteria of a candidate WLAN may include one or more of the following: 1) exceeding a signal-strength threshold; 2) having a secure security status.

Signal strength is typically measured in decibel milliwatts (dBm). Depending upon the specifics of a WLAN, a signal strength of −30 dBm to −60 dBm is often considered reliable, and −80 dBm is often the minimum signal strength needed to make a connection. Thus, an example of a signal-strength threshold may be −70 dBm, which is not very strong, but mostly sufficient for OTA updates download.

A WLAN has a secure security status when its communication is encrypted, and its access is limited, perhaps by a password. For example, a WLAN may have its communication encrypted using Wired Equivalent Privacy (WEP), Wi-Fi Protected Access (WPA), Wi-Fi Protected 2 (WPA2), Advanced Encryption Standard (AES), or the like.

After this data is gathered, parked vehicle 140 scores one or more of the qualified candidates. The scoring may include making additional determinations and updates, as needed, to a scoring data structure. Depending upon the determination of each parking session occurrence, parked vehicle 140 updates the scoring data structure accordingly to track and ultimately identify an offload-opportunity WLAN and suggest that the user of the vehicle choose that WLAN for connection to a data network (e.g., the Internet).

The scoring data structure may include one or more sets of associated data fields. More particularly, each set is associated with a WLAN that is an established qualified candidate to be an offload-opportunity WLAN. An example of a scoring data structure follows:

TABLE 1

| Identifier | Score | Encounter counter | Time range parked | Last Seen | Channel |
|---|---|---|---|---|---|
| HomeNet | 30 | | | | |
| FamilyNet | 1 | | | | |
| WorkNet | 20 | | | | |

If a qualified WLAN is already in the scoring data structure, then parking vehicle 140 updates the data fields associated with that WLAN in the scoring data structure and adjusts its associated score. For example, if HomeNet is a qualified WLAN as determined during the parking session termination operation, then parked vehicle 140 updates the data fields associated with the HomeNet set, as shown in Table 1 above. In this example, parked vehicle 140 may increment the "encounter counter" of HomeNet by one. Thus, the encounter counter's value (e.g., cardinality) may be increased by one. Consequently, in this example, parked vehicle 140 may increment the score of HomeNet by one from thirty to thirty-one.

If a qualified WLAN is not already in the scoring data structure, then parking vehicle 140 adds a new set to the scoring data structure for the new qualified WLAN. Parked vehicle 140 updates the data fields associated with that new WLAN in the scoring data structure and adjusts its associated score. For example, suppose FamilyNet is a qualified WLAN as determined during the parking session termination operation. In that case, parked vehicle 140 adds a new set for FamilyNet and updates the data fields associated with the FamilyNet set, as shown in Table 1 above. In this example, parked vehicle 140 may increment the score of FamilyNet by one from zero to one.

In other implementations, other factors may weigh the scoring in one way or another. For example, the score of a qualified WLAN may be incremented under the condition that the WLAN was last seen ninety days ago or less.

Notice, in the described implementation, that parked vehicle 140 updates the scoring data structure in response to the parking session exceeding the minimum parking time (e.g., six hours), and it updates just the WLANs that meet qualifying criteria, such as exceeding a signal-strength threshold and/or having a secure security status.

Parked vehicle 140 analyzes the updated scoring data structure, and based on the scoring, the vehicle may designate a WLAN of one or more scored WLANs in the scoring data structure as an offload-opportunity network to join. The designation may include comparing values of the score data fields of the sets of the scoring data structure. Based on the comparison, a particular WLAN may be determined to have the most significant score associated therewith. Consequently, that particular WLAN may be nominated as the offload-opportunity network to join.

Parked vehicle 140 may designate the highest-scored WLAN in the scoring data structure that exceeds a minimum score threshold. For example, if the minimum score threshold is thirty, then HomeNet (with its updated score of thirty-one) exceeds the threshold and is the highest-scored WLAN in the data structure.

One of the purposes of having a minimum score threshold is to raise the confidence level that the designated WLAN is one that the user frequently visits, stays for an extended period of time (to maximize availability for off-load), and that the user is likely to have access to the WLAN. Another reason is to minimize how often the user is asked to join a network.

In response to the WLAN being designated as the offload-opportunity network to join, parked vehicle 140 prompts the user of the vehicle to authorize the vehicle to join the opportunity network.

In response to the user's affirmative response to the prompt, parked vehicle 140 joins the WLAN designated as the offload-opportunity network to communicate therethrough. In response to the user's negative or lack of response to the prompt, parked vehicle 140 does not join the WLAN designated as the offload-opportunity network to communicate therethrough. In addition, parked vehicle 140 adjusts the scoring data structure. In some instances, the score is decreased for the rejected WLAN. In other instances, the rejected WLAN is removed from the data structure.

Notice, in the described implementation, that parked vehicle 140 does not detect its location or identify an associated user to implement the technology described herein. Thus, parked vehicle 140 does not use traditional location determination technologies, such as Global Positioning Services (GPS), Wi-Fi™ location positioning, cellular location positioning, Bluetooth location positioning, radio-frequency identification (RFID), fixed-location beacons (Geobeacons), or the like. Because of this, this technology does not utilize location-related information based on person-specific information about the user. Thus, personal data is respected.

Figure 2:
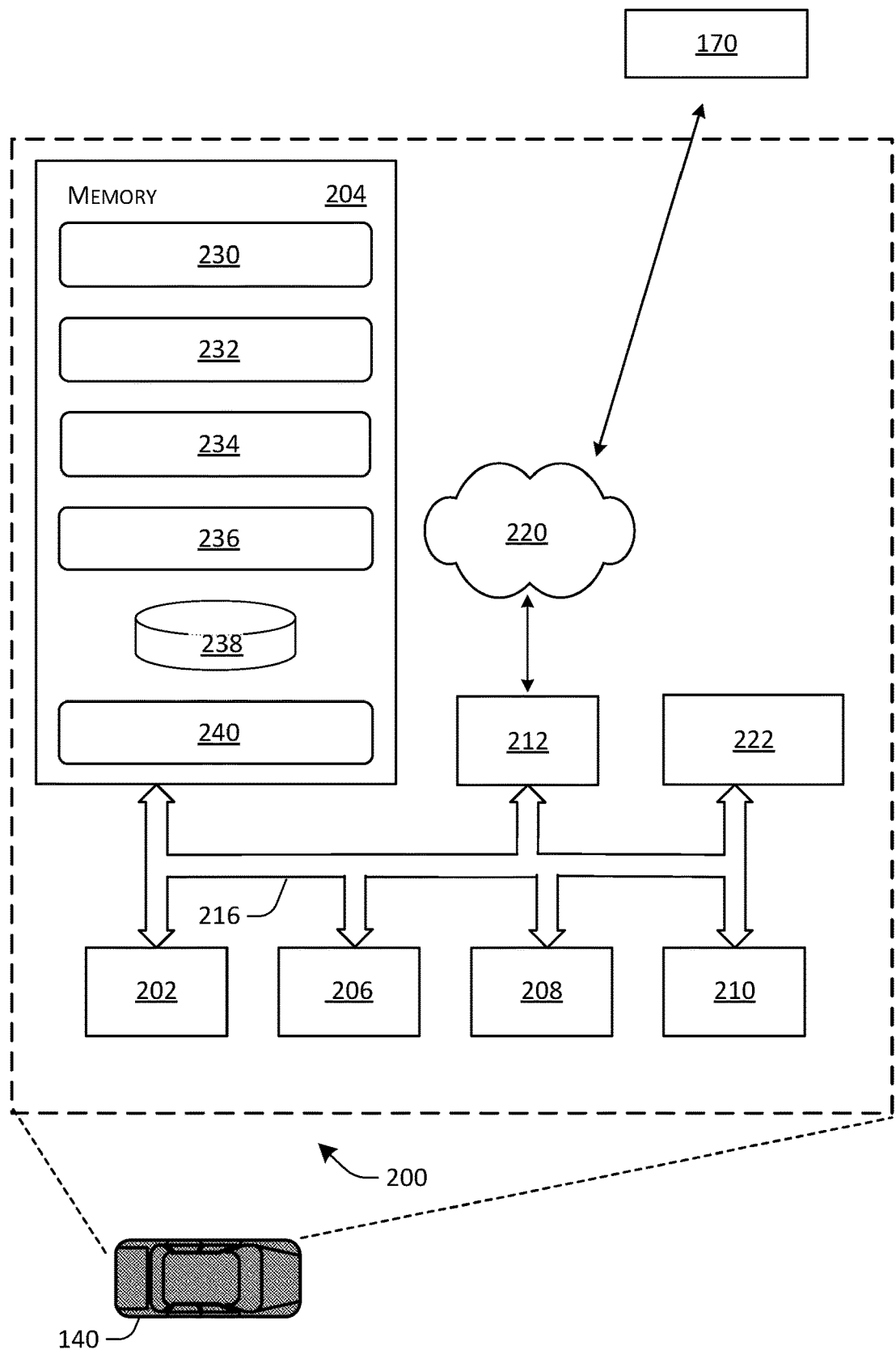
FIG. 2 illustrates an example of computer architecture for a computing system capable of executing the technology described herein.

FIG. 2 illustrates an example of computer architecture for a computing system 200 capable of executing the technology described herein. The computer architecture shown in this figure illustrates a typical computer, server computer, workstation, desktop computer, laptop, tablet, network appliance, e-reader, smartphone, embedded system, or another computing device. Computer system 200 may be part of parked vehicle 140 and can be utilized to execute the functionalities presented herein.

The computing system 200 includes a processor 202 (e.g., central processor unit or "CPU"), system storage (e.g., memory) 204, input/output (I/O) devices 206—such as a display, a keyboard, a mouse, a microphone, a camera, and associated controllers, a secondary storage system 208 (e.g., a hard drive), and various other subsystems 210. In various embodiments, the computing system 200 also includes a communications ("comm") port 212, operable to connect to a communications ("comm") system 220. The computing system 200 may include or be connected to a passenger interactive system 222, which manages interactions with the passengers of parked vehicle 140. The foregoing components may be interconnected via one or more buses 216 and/or comm system 220.

The comm system 220 enables internal communications within parked vehicle 140 and external wireless communications, such as with the comm center 170. Internal communication may be, for example, via a local area network. The external wireless communication may include, for example, one or more of the following: satellite communications (as depicted by satellite 160 in FIG. 1), WI-FI™, BLUETOOTH™, cellular communications, radio communications, and/or Internet communications.

System memory 204 may store data and machine-readable instructions (e.g., computer-readable instructions). Machine-readable instructions may configure the computing system 200. Machine-readable instructions may include one or more instruction modules. The instruction modules may include computer program modules. The instruction modules may include one or more of a parking-session manager 230, a WLAN environment monitor 232, a scoring director 234, an off-load WLAN datastore manager 236, an off-load WLAN datastore 238, an off-load WLAN supervisor 240, and/or other instruction-based modules.

While the modules in the example depicted by this figure are implemented using machine-readable instructions, other similarly functioning modules may be implemented using little to no machine-readable instructions. Such modules are implemented via hardware (e.g., circuitry) and analog and/or digital signals. In other instances, such modules may be implemented via a combination of hardware and machine-implemented instructions.

Parking-session manager 230 detects the start and the end of the parking session. Once parked vehicle 140 is indeed parked, parking-session manager 230 detects that the vehicle is no longer in motion (i.e., stationary) and has been placed into a parking "gear." The vehicle may be placed into "park." This initiates a parking session.

Once in the parking session, WLAN environment monitors 232 performs an initial inventory of the WLANs within the vehicle's range. As part of the initial inventory, WLAN environment monitors 232 scans for and identifies one or more in-range WLANs. Off-load WLAN datastore manager 236 tracks the identified one or more in-range WLANs by, for example, creating an initial inventory list that documents each WLAN detected and its associated properties, such as its identifiers (e.g., service set identifier (SSID) and media access control (MAC) address), signal measurement, security status, current time and date, and channel of operation. The initial inventory list may be located in off-load WLAN datastore 238.

Once the driver returns to parked vehicle 140, the driver activates (e.g., "turns the ignition on"). Once parking-session manager 230 detects that activation, the parking session ends (i.e., terminates). Thus, in response to the detection of the activation of the vehicle, parking-session manager 230 terminates the parking session of the vehicle.

As part of the parking-session termination, parking-session manager 230 calculates the duration of the parking session. The parking-session duration is the difference between the time the parking session was initiated and the time it ended.

Parking-session manager 230 determines whether the parking-session duration exceeds a minimum parking time. Suppose the parking-session duration exceeds the minimum parking time. In that case, parking-session manager 230 directs WLAN environment monitor 232 to perform an inventory of the WLAN environment, which are the WLANs within the range of parked vehicle 140.

As it did with the initial session inventory at the start of the parking session, WLAN environment monitors 232 scans for and identifies one or more in-range WLANs and off-loads WLAN datastore manager 236 documenting each WLAN detected and its associated properties. These properties may include the WLAN's identifiers, signal measurement, security status, current time and date, and channel of operation. The post-session inventory list may be located in off-load WLAN datastore 238.

Furthermore, after the parking-session termination, off-load WLAN datastore manager 236 determines which one or more of the WLANs were identified during both the initial session inventory and the post-session inventory list. These WLANs are selected as candidates to be an offload-opportunity WLAN that respects the personal data of a user of parked vehicle 140.

Further still, after the parking-session termination, off-load WLAN datastore manager 236 determines whether one or more of the candidate WLANs meet one or more qualifying criteria. Examples of qualifying criteria of a candidate WLAN may include one or more of the following: 1) exceeding a signal-strength threshold; 2) having a secure security status.

After this data is gathered, scoring director 234 scores one or more of the qualified candidates. The scoring may include making additional determinations and updates, as needed, to a scoring data structure of the off-load WLAN datastore 238. Depending upon those determinations of each parking-session occurrence, scoring director 234 updates the scoring data structure accordingly to track and ultimately identify an offload-opportunity WLAN and suggest that the user of the vehicle choose that WLAN for connection to a data network.

The scoring data structure of the off-load WLAN datastore 238 may include one or more sets of associated data fields. More particularly, each set is associated with a WLAN that is an already qualified candidate to be an offload-opportunity WLAN. An example of a scoring data structure is depicted above in Table 1.

If a qualified WLAN is already in the scoring data structure, then off-load WLAN datastore manager 236 updates the data fields associated with that WLAN in the scoring data structure and adjusts its associated score. If a qualified WLAN is not already in the scoring data structure, then off-load WLAN datastore manager 236 adds a new set to the scoring data structure for the new qualified WLAN. Parked vehicle 140 updates the data fields associated with that new WLAN in the scoring data structure and adjusts its associated score.

Notice, in the described implementation, the scoring data structure is updated in response to the parking session exceeding the minimum parking time (e.g., six hours) and when the WLANs meet the qualifying criteria, such as exceeding a signal-strength threshold and/or having a secure security status.

Off-load WLAN supervisor 240 analyzes the updated scoring data structure and based on the scoring, the vehicle may designate a WLAN of one or more scored WLANs in the scoring data structure as an offload-opportunity network to join. Off-load WLAN supervisor 240 may designate the highest-scored WLAN in the scoring data structure that exceeds a minimum score threshold.

In response to the WLAN being designated as the offload-opportunity network to join, off-load WLAN supervisor 240 prompts the user of the vehicle to authorize the vehicle to join the opportunity network. This may be accomplished, at least partially, using passenger interactive system 222.

In response to the user's affirmative response to the prompt, off-load WLAN supervisor 240 directs the comm ports 212 and associated systems to join the WLAN designated as the offload-opportunity network to communicate therethrough. In response to the user's negative or lack of response to the prompt, off-load WLAN supervisor 240 does not direct a joining of the WLAN designated as the offload-opportunity network to communicate therethrough. In addition, scoring director 234 adjusts the scoring data structure. In some instances, the score is decreased for the rejected WLAN. In other instances, the rejected WLAN is removed from the data structure.

The functionality of these example modules depicted by this figure may be organized differently. For example, the functionality of these example models may be distributed across various commonly implemented onboard automotive systems, such as Body Control Module (BCM), telematics units (TCP), infotainment control unit (VCU), and vehicle displays (VCD).

The BCM is an electronic control unit in a vehicle that manages and controls various electrical and electronic functions within the vehicle's body. Typically, it controls systems such as lighting, power windows, central locking, wipers, climate control, safety features, audio systems, instrument clusters, and security systems. Typically, the BCM receives input from sensors and switches and sends commands to the corresponding components or systems, ensuring the proper functioning of these features in the vehicle.

The TCP is an electronic device found in vehicles that combines telecommunications and information technology. It may collect and communicate data related to the vehicle's performance, location, and driver behavior. Typically, the TCP uses global positioning system (GPS) or other positioning systems for vehicle tracking and location services, enables communication and connectivity through cellular or satellite networks, provides vehicle diagnostics and maintenance information, incorporates safety and security features, monitors driver behavior, and allows for connected services and applications. TCP enhances vehicle functionality, enables data-driven insights, and improves safety and efficiency in areas such as fleet management, vehicle tracking, and connected car services.

The VCU is an electronic device in vehicles that combines entertainment and information features into a single interface. Typically, it serves as a centralized control hub for various multimedia and communication functions. The VCU typically consists of hardware, such as a display screen and control buttons or a touchscreen, along with software that enables access to entertainment options, navigation systems, communication features, and vehicle settings. It provides features such as audio and video playback, BLUETOOTH connectivity for hands-free calling and music streaming, integration with smartphone applications, GPS navigation, and access to vehicle settings and information.

The VCD refers to the interface or screen in a vehicle that displays information and allows the driver to control various vehicle functions. It can include digital instrument clusters, infotainment screens, or dedicated control panels. The display provides vehicle data like speed, fuel level, and warnings, allowing the driver to interact with features such as audio, navigation, climate control, vehicle settings, and diagnostics. The specific design and features of the VCD can vary between vehicles, but its purpose is to provide a user-friendly interface for monitoring and managing vehicle functions.

Figure 3:
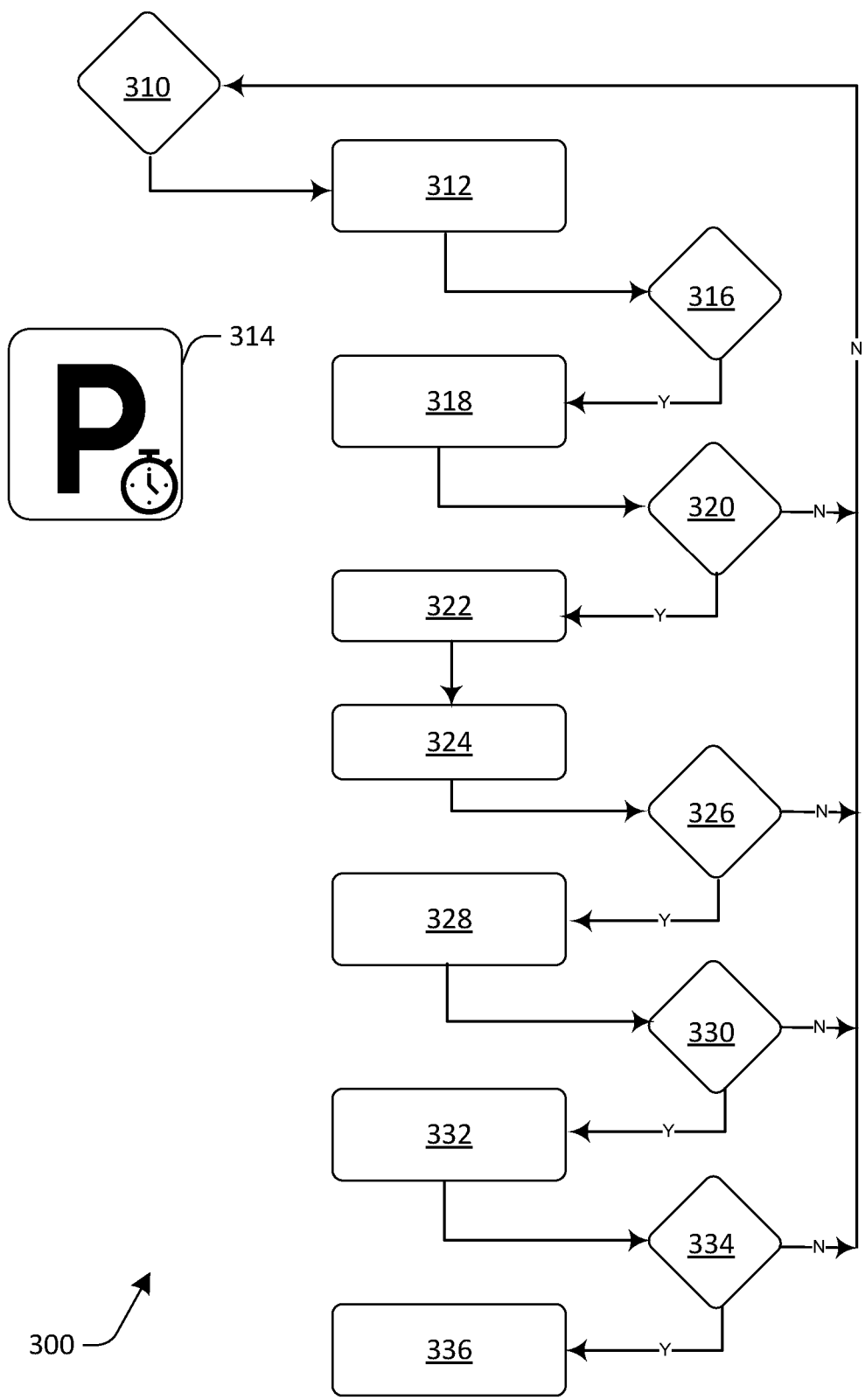
FIG. 3 is a flowchart illustrating a process to perform an example method that facilitates the selection of offload-opportunity wireless networks that respect personal data, in accordance with one or more implementations described herein.

FIG. 3 is a flowchart that illustrates process 300 to perform an example method that facilitates the selection of offload-opportunity wireless networks that respects personal data. For case of illustration, process 300 may be described as being performed by a system described herein. Such a system may be, for example, parked vehicle 140 or the computing system 200, as described herein. However, process 300 may be performed by other devices or a combination of devices and systems.

Process 300 facilitates the selection of offload-opportunity wireless networks that respect personal data. Process 300 includes tracking a wireless network environment of a parked vehicle and selecting qualifying candidate wireless networks to be an offload-opportunity wireless network. The technology further includes joining the selected wireless network in response to a user's affirmative confirmation to do so.

At operation 310, the system monitors the vehicle to detect whether the vehicle is parked. Once the vehicle is parked, the system detects that it is no longer in motion and has been placed into a "park" gear. If the vehicle is not parked, operation 310 does not detect that the vehicle is parked and continues to monitor. Once the vehicle's parking is detected, process 300 proceeds to operation 312.

At operation 312, the system initiates a parking session 314 of the parked vehicle in response to the detection that the vehicle is parked (as detected by operation 310). The parking-session initiation of this operation includes performing an initial inventory of the WLANs within the vehicle's range. The system scans for and identifies one or more in-range WLANs as part of the initial inventory. The system tracks the identified one or more in-range WLANs by, for example, creating an initial inventory list that documents each WLAN detected and its associated properties. The initial inventory list may be in an onboard data storage, such as off-load WLAN datastore 238, or uploaded to an off-board data storage. Once parked, the vehicle is presumably deactivated during parking session 314.

At operation 316, the system monitors the vehicle to detect that the vehicle is activated. Once the driver returns to the vehicle, the driver activates the vehicle. If the vehicle remains parked and deactivated, operation 316 does not detect that the vehicle is activated and continues to monitor. Once the vehicle's parking is activated, process 300 proceeds to operation 318.

At operation 318, the system terminates parking session 314 of the vehicle in response to the detection of the activation of the vehicle (as detected by operation 316). As part of the parking-session termination, operation 318 includes calculating the duration of parking session 314. The parking-session duration is the difference between the time that parking session 314 was initiated (at operation 312) and the time that it ended (at operation 318).

At operation 320, the system determines whether the parking-session duration exceeds a minimum parking time. If the parking-session duration does not exceed the minimum parking time, process 300 returns to operation 310 once the vehicle is no longer parked. Otherwise, if the parking-session duration exceeds the minimum parking time, then process 300 proceeds to operation 322.

At operation 322, the system performs an inventory of the WLAN environment, which are the WLANs within the vehicle's range. As it did with the initial session inventory at the start of the parking session, the system scans for and identifies one or more in-range WLANs and documents each WLAN detected and its associated properties, such as its identifiers, signal measurement, security status, current time and date, and channel of operation. For example, the post-session inventory list may be located in off-load WLAN datastore 238.

At operation 324, the system determines which one or more of the WLANs were identified during both the initial session inventory and the post-session inventory list. These WLANs are selected as candidates to be an offload-opportunity WLAN that respects the personal data of a vehicle user.

At operation 326, the system determines whether one or more candidate WLANs meet one or more qualifying criteria. Examples of qualifying criteria of a candidate WLAN may include one or more of the following: 1) exceeding a signal-strength threshold; 2) having a secure security status. If one or more candidate WLANs fail to meet one or more qualifying criteria or there is no candidate WLAN, then process 300 returns to operation 310 once the vehicle is no longer parked. Otherwise, process 300 proceeds to operation 328.

At operation 328, the system scores one or more of the qualified candidates. The scoring may include making additional determinations and updates, as needed, to a scoring data structure. Depending upon those determinations of each parking-session occurrence, the system updates the scoring data structure accordingly to track and ultimately identify an offload-opportunity WLAN and suggest that the vehicle user choose that WLAN for connection to a data network.

The scoring data structure may include one or more associated data fields. More particularly, each set is associated with a WLAN that is an already qualified candidate to be an offload-opportunity WLAN. An example of a scoring data structure is depicted above in Table 1.

As part of operation 328, if a qualified WLAN is already in the scoring data structure, then the system updates the data fields associated with that WLAN in the scoring data structure and adjusts its associated score. If a qualified WLAN is not already in the scoring data structure, then the system adds a new set to the scoring data structure for the new qualified WLAN. The system updates the data fields associated with that new WLAN in the scoring data structure and adjusts its associated score.

Notice, in the described implementation, the scoring data structure is updated in response to the parking session exceeding the minimum parking time (e.g., six hours) and updated when the WLANs meet the qualifying criteria, such as exceeding a signal-strength threshold and/or having a secure security status.

As part of operation 328, the system analyzes the updated scoring data structure and based on the scoring, the system may designate a WLAN of one or more scored WLANs in the scoring data structure as an offload-opportunity network to join. For example, the system may designate the highest-scored WLAN in the scoring data structure that exceeds a minimum score threshold.

At operation 330, the system determines whether a WLAN is designated as the offload-opportunity network to join. If not, then process 300 returns to operation 310 once the vehicle is no longer parked. Otherwise, process 300 proceeds to operation 332. The designation may include comparing values of the score data fields of the sets of the scoring data structure, based on the comparison, determining that a particular WLAN has the greatest (i.e., most significant) score associated in addition to that, and nominating the particular WLAN as the offload-opportunity network to join.

At operation 332, the system prompts the vehicle user to authorize the vehicle to join the opportunity network. This may be accomplished, at least in part, using passenger interactive system 222, for example.

At operation 334, the system determines the user's response to the prompt. Suppose the user's response is negative or lacking (e.g., after a timeout). In that case, the system does not direct a joining of the WLAN designated as the offload-opportunity network to communicate therethrough. In addition, the system adjusts the scoring data structure. In some instances, the score is decreased for the rejected WLAN. In other instances, the rejected WLAN is removed from the data structure. Further, process 300 returns to operation 310 once the vehicle is no longer parked. Otherwise, in response to the user's affirmative response to the prompt, process 300 proceeds to operation 336.

At operation 336, the system joins the WLAN designated as the offload-opportunity network to communicate therethrough.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels and are not intended to impose numerical or positional requirements on their objects. As used herein, an element or step recited in the singular and preceded by the word "a" or "an" should be understood as not excluding the plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51% to 99% out of a possible extent of 100%", and do not necessarily mean "perfectly". "completely", "strictly", "entirely" or "100%". Additionally, the word "proximate" may be used herein to describe the location of an object or portion thereof concerning another object or portion thereof, and/or to describe the positional relationship of two objects or their respective portions thereof concerning each other, and may mean "near", "adjacent", "close to", "close by", "at" or the like. And, the phrase "approximately equal to" as used herein may mean one or more of "exactly equal to", "nearly equal to", "equal to somewhere between 90% and 110% of" or the like.

This written description uses examples, including the best mode, to enable those skilled in the art to make and use devices, systems, and compositions of matter, and to perform methods, according to this disclosure. It is the following claims, including equivalents, which define the scope of the present disclosure.

What is claimed is:

1. A method comprising:
   detecting that a vehicle is parked;
   in response to the detection that the vehicle is parked, initiating a parking session of the vehicle, wherein the parking-session initiation includes: scanning for, identifying, and tracking one or more wireless local area networks (WLANs) within range of the vehicle;
   detecting that the vehicle is activated;
   in response to the detection of the activation of the vehicle, terminating the parking session of the vehicle, wherein the parking-session termination includes: calculating a duration of the parking session; scanning for and identifying one or more WLANs within range of the vehicle;
   selecting one or more of the WLANs that were identified during both the parking-session initiation and the parking-session termination; and determining that one or more of the selected WLANs meet one or more qualifying criteria;
   in response to the duration of the parking session exceeding the parking-session threshold, scoring one or more of the determined WLANs;
   based on the scoring, designating a WLAN of one or more scored WLANs as an offload-opportunity network to join;
   prompting a user of the vehicle to authorize the vehicle to join the opportunity network; and
   in response to the prompting, joining the opportunity network to communicate therethrough.

2. A method of claim 1, wherein one or more qualifying criteria of the selected WLANs include having a signal strength exceeding a signal-strength threshold and having a secure security status.

3. A method of claim 1 further comprising, in response to the duration of the parking session exceeding the parking-session threshold, updating a set of data fields in a scoring data structure, the set being associated with at least one of the determined WLAN.

4. A method of claim 3, wherein one of the data fields of the set includes an encounter count, the updating further includes incrementing value of the encounter count.

5. A method of claim 3, wherein the data fields of the set are selected from a group consisting of an encounter count, a signal measurement, a security status, a parking-session duration, a parked time-of-day, a date of last encounter, and a channel of operation.

6. A method of claim 3, wherein the scoring includes calculating a score based on the set associated with at least one of the determined WLAN and storing the calculated score in the scoring data structure in association therewith.

7. A method of claim 1, wherein the scoring includes calculating a score associated with at least one of the scored WLAN and storing the calculated score in a scoring data structure in association therewith.

8. A method of claim 1, wherein the designating includes:
accessing a scoring data structure containing sets of data fields, each set being associated with one WLAN of a collection of WLANs and each set having a score data field; and
updating the score data field of a set associated with a WLAN that matches one of the determined WLANs.

9. A method of claim 8, wherein the designating further includes:
comparing values of the score data fields of the sets of the scoring data structure;
based on the comparing, determining that a particular WLAN has a greatest score associated therewith; and
nominating the particular WLAN as the offload-opportunity network to join.

10. A non-transitory machine-readable storage medium encoded with instructions executable by one or more processors that, when executed, direct one or more processors to perform operations comprising:
detecting that a vehicle is parked;
in response to the detection that the vehicle is parked, initiating a parking session of the vehicle, wherein the parking-session initiation includes: scanning for, identifying, and tracking one or more wireless local area networks (WLANs) within range of the vehicle;
detecting that the vehicle is activated;
in response to the detection of the activation of the vehicle, terminating the parking session of the vehicle, wherein the parking-session termination includes: calculating a duration of the parking session; scanning for and identifying one or more WLANs within range of the vehicle; selecting one or more of the WLANs that were identified during both the parking-session initiation and the parking-session termination; and determining that one or more of the selected WLANs meet one or more qualifying criteria;
in response to the duration of the parking session exceeding the parking-session threshold, scoring one or more of the determined WLANs; and
based on the scoring, designating a WLAN of one or more scored WLANs as an offload-opportunity network to join.

11. A non-transitory machine-readable storage medium of claim 10, wherein the operations further comprise, in response to the duration of the parking session exceeding the parking-session threshold, updating a set of data fields in a scoring data structure, the set being associated with at least one of the determined WLAN.

12. A non-transitory machine-readable storage medium of claim 11, wherein one of the data fields of the set includes an encounter count, the updating further includes incrementing value of the encounter count.

13. A non-transitory machine-readable storage medium of claim 10, wherein the scoring operation includes calculating a score associated with at least one of the scored WLAN and storing the calculated score in a scoring data structure in association therewith.

14. A non-transitory machine-readable storage medium of claim 10, the operations further comprising prompting a user of the vehicle to authorize the vehicle to join the opportunity network.

15. A non-transitory machine-readable storage medium of claim 14, the operations further comprising, in response to the prompting, joining the opportunity network to communicate therethrough.

16. A non-transitory machine-readable storage medium of claim 11, the operations further comprising:
prompting a user of the vehicle to authorize the vehicle to join the opportunity network; and
in response to the prompting, resetting values in one or more of the data fields in the scoring data structure.

17. A method that facilitates a selection of an offload-opportunity wireless network that respects personal data of a user of a vehicle, the method comprising:
detecting that a vehicle is parked;
in response to the detection that the vehicle is parked, initiating a parking session of the vehicle, wherein the parking-session initiation includes: scanning for, identifying, and tracking one or more wireless local area networks (WLANs) within range of the vehicle;
detecting that the vehicle is activated;
in response to the detection of the activation of the vehicle, terminating the parking session of the vehicle, wherein the parking-session termination includes: calculating a duration of the parking session; scanning for and identifying one or more WLANs within range of the vehicle;
selecting one or more of the WLANs that were identified during both the parking-session initiation and the parking-session termination; and determining that one or more of the selected WLANs meet one or more qualifying criteria;
in response to the duration of the parking session exceeding the parking-session threshold, scoring one or more of the determined WLANs;
based on the scoring, designating a WLAN of one or more scored WLANs as an offload-opportunity network to join;
prompting a user of the vehicle to authorize the vehicle to join the opportunity network; and
in response to the prompting, joining the opportunity network to communicate therethrough.

18. A method of claim 17, further comprising:
prompting a user of the vehicle to authorize the vehicle to join the opportunity network; and
in response to the prompting, joining the opportunity network to communicate therethrough.

19. A method of claim 17, further comprising accessing a set of data fields in a scoring data structure, the set being associated with at least one of the determined WLAN, wherein the data fields of the set are selected from a group consisting of an encounter count, a signal measurement, a security status, a parked duration, a parked time-of-day, a date of last encounter, and a channel of operation.

20. A method of claim 17, wherein the method is performed free of access to the personal data of the user of the vehicle.

* * * * *